(12) United States Patent
Stauter

(10) Patent No.: US 11,142,038 B2
(45) Date of Patent: Oct. 12, 2021

(54) LABYRINTH SEAL FOR FAN ASSEMBLY

(71) Applicant: Carrier Corporation, Palm Beach Gardens, FL (US)

(72) Inventor: Richie C. Stauter, Fayetteville, NY (US)

(73) Assignee: CARRIER CORPORATION, Palm Beach Gardens, FL (US)

(*) Notice: Subject to any disclaimer, the term of this patent is extended or adjusted under 35 U.S.C. 154(b) by 120 days.

(21) Appl. No.: 16/201,501

(22) Filed: Nov. 27, 2018

(65) Prior Publication Data

US 2019/0184786 A1 Jun. 20, 2019

Related U.S. Application Data

(60) Provisional application No. 62/599,868, filed on Dec. 18, 2017.

(51) Int. Cl.
*B60H 1/00* (2006.01)
*B60H 1/32* (2006.01)
(Continued)

(52) U.S. Cl.
CPC ....... *B60H 1/00464* (2013.01); *B60H 1/3226* (2013.01); *B60H 1/3232* (2013.01); *F04D 29/164* (2013.01); *F04D 29/326* (2013.01)

(58) Field of Classification Search
CPC ... F04D 29/164; F04D 29/326; B60H 1/3232; B60H 1/00464; B60H 1/3226
See application file for complete search history.

(56) References Cited

U.S. PATENT DOCUMENTS 3,842,902 A * 10/1974 Poslusny ............... F04D 29/164
  415/173.6
4,181,172 A * 1/1980 Longhouse ............ B60K 11/04
  415/220

(Continued)

FOREIGN PATENT DOCUMENTS

CN 201896792 U 7/2011
DE 9017417 U1 3/1991
(Continued)

OTHER PUBLICATIONS

European Search Report; 18213402.3; dated Aug. 19, 2019; 10 Pages.

*Primary Examiner* — Tavia Sullens
(74) *Attorney, Agent, or Firm* — Cantor Colburn LLP

(57) ABSTRACT

A transport refrigeration unit for use with a transport trailer includes a structural framework mountable to a wall of the transport trailer, a condenser heat exchanger unit mounted to the structural framework, an evaporator housing separated from the condenser heat exchanger by a distance, and at least one condenser fan assembly positioned aft of the condenser heat exchanger unit and forward of the evaporator housing. The at least one condenser fan assembly includes a fan casing and a fan rotor rotatable relative to the fan casing about an axis. The fan rotor has a plurality of fan blades. A shroud is coupled to a radially outer end of the plurality of fan blades. The shroud includes an axially oriented protrusion extending from a distal end of the shroud towards the fan casing and a clearance is formed between the protrusion and the casing defining a convoluted flow path.

13 Claims, 10 Drawing Sheets

(51) Int. Cl.
 *F04D 29/16* (2006.01)
 *F04D 29/32* (2006.01)

(56) References Cited

U.S. PATENT DOCUMENTS

| | | | |
|---|---|---|---|
| 4,365,484 A * | 12/1982 | Carson | B60H 1/3226 |
| | | | 62/239 |
| 4,738,586 A | 4/1988 | Harter | |
| 6,350,102 B1 | 2/2002 | Bailey et al. | |
| 6,508,624 B2 | 1/2003 | Nadeau et al. | |
| 6,595,744 B2 | 7/2003 | Van Houten | |
| 6,874,990 B2 | 4/2005 | Nadeau | |
| 7,165,943 B2 | 1/2007 | Suzuki et al. | |
| 7,393,182 B2 | 7/2008 | Matheny | |
| 7,438,522 B2 | 10/2008 | Eimer | |
| 7,549,841 B1 | 6/2009 | Marussich | |
| 7,794,204 B2 | 9/2010 | Stevens et al. | |
| 8,206,092 B2 | 6/2012 | Tholen et al. | |
| 8,308,429 B2 | 11/2012 | Walker | |
| 8,459,939 B2 | 6/2013 | Goto et al. | |
| 8,568,095 B2 | 10/2013 | Bushnell | |
| 8,845,283 B2 | 9/2014 | Cairo et al. | |
| 9,169,849 B2 | 10/2015 | Ward | |
| 9,228,591 B2 | 1/2016 | Choi et al. | |
| 9,777,582 B2 | 10/2017 | Zelesky et al. | |
| 2009/0211286 A1 | 8/2009 | Stauter et al. | |
| 2009/0211287 A1 | 8/2009 | Steele et al. | |
| 2010/0040458 A1 * | 2/2010 | Bushnell | F04D 29/164 |
| | | | 415/173.6 |
| 2015/0260200 A1 * | 9/2015 | Dreesen | F04D 29/164 |
| | | | 415/220 |
| 2015/0285259 A1 | 10/2015 | Wennerstrom | |
| 2015/0354841 A1 | 12/2015 | Amr et al. | |
| 2017/0184125 A1 | 6/2017 | Matsui et al. | |

FOREIGN PATENT DOCUMENTS

| | | |
|---|---|---|
| DE | 10207275 A1 | 2/2003 |
| DE | 60117177 T2 | 9/2006 |
| JP | H0727468 A | 1/1995 |
| JP | 2004084524 A | 3/2004 |
| JP | 2005264803 A | 9/2005 |
| JP | 2009299553 A | 7/2011 |
| WO | 2015130254 A2 | 9/2015 |
| WO | 2015131988 A1 | 9/2015 |
| WO | 2016168528 A1 | 10/2016 |

* cited by examiner

LABYRINTH SEAL FOR FAN ASSEMBLY

CROSS-REFERENCE TO RELATED APPLICATIONS

This application claims the benefit of U.S. Provisional Application Ser. No. 62/599,868, filed Dec. 18, 2017, which is incorporated herein by reference in its entirety.

BACKGROUND

Exemplary embodiments relate generally to transport refrigeration systems and, more particularly, to a condenser fan assembly for use in a transport refrigeration system.

Transport refrigeration systems are composed of a power system, refrigeration circuiting, air management systems, and a control system, which are all packaged in a unit mounted to a transport device, such as a trailer for example. The air management system circulates air through a load in the trailer and back through the evaporator coil, which subsequently removes heat from the air stream and thereby cools the cargo.

European regulations strictly limit the length of a transport refrigeration trailer and how far a transport refrigeration unit can protrude from the front wall of such trailers. These limits severely restrict the front-to-back space (depth) available within the unit for component arrangement. As a result, the axial (depth-wise) extent of all components must be minimized without impacting the functionality of the unit. This constraint particularly impacts the air management system components, i.e. fans, which must not only be compact while providing high performance, but also take full advantage of the space available to provide a flow path sufficient to minimize flow losses.

BRIEF DESCRIPTION

In an embodiment, a transport refrigeration unit for use with a transport trailer includes a structural framework mountable to a wall of the transport trailer, a condenser heat exchanger unit mounted to the structural framework, an evaporator housing separated from the condenser heat exchanger by a distance, and at least one condenser fan assembly positioned aft of the condenser heat exchanger unit and forward of the evaporator housing. The at least one condenser fan assembly includes a fan casing and a fan rotor rotatable relative to the fan casing about an axis. The fan rotor has a plurality of fan blades. A shroud is coupled to a radially outer end of the plurality of fan blades. The shroud includes an axially oriented protrusion extending from a distal end of the shroud towards the fan casing and a clearance is formed between the protrusion and the casing defining a convoluted flow path.

In addition to one or more of the features described herein, or as an alternative, in further embodiments the convoluted flow path forms a labyrinth seal including a plurality of abrupt turns.

In addition to one or more of the features described herein, or as an alternative, in further embodiments the convoluted flow path includes at least one 180 degree turn.

In addition to one or more of the features described herein, or as an alternative, in further embodiments the at least one 180 degree turn of the convoluted flow path directs an air flow parallel to the axis.

In addition to one or more of the features described herein, or as an alternative, in further embodiments the convoluted flow path includes a first 180 degree turn and a second 180 degree turn.

In addition to one or more of the features described herein, or as an alternative, in further embodiments the shroud radially overlaps a portion of the casing.

In addition to one or more of the features described herein, or as an alternative, in further embodiments the shroud has a bellmouth curve.

In addition to one or more of the features described herein, or as an alternative, in further embodiments the protrusion extends from a portion of the shroud in overlapping arrangement with the casing.

In addition to one or more of the features described herein, or as an alternative, in further embodiments the casing has a trench formed therein, wherein the trench is generally aligned with the protrusion.

In addition to one or more of the features described herein, or as an alternative, in further embodiments the protrusion is received within the trench such that the protrusion axially overlaps the casing.

In addition to one or more of the features described herein, or as an alternative, in further embodiments a contour of the trench is complementary in shape to the protrusion.

In addition to one or more of the features described herein, or as an alternative, in further embodiments the protrusion includes beveled edges and the trench and surfaces of the trench 74 opposite the beveled edges of the protrusion 72 have a similar bevel.

In addition to one or more of the features described herein, or as an alternative, in further embodiments the casing includes a lip, and the trench is at least partially defined by the lip.

In addition to one or more of the features described herein, or as an alternative, in further embodiments a surface of the lip has an angle between about 0 degrees and 90 degrees.

In addition to one or more of the features described herein, or as an alternative, in further embodiments the convoluted flow path fluidly couples an interior of the fan assembly to an inlet end of the fan assembly.

In addition to one or more of the features described herein, or as an alternative, in further embodiments the convoluted flow path restricts a flow of air from a high pressure area towards a low pressure area.

According to another embodiment, a transport refrigeration unit for use with a transport trailer includes a structural framework mountable to a wall of the transport trailer, a condenser heat exchanger unit, an evaporator housing, and at least one condenser fan assembly for blowing air over the condenser heat exchanger unit. The at least one condenser fan assembly includes a fan casing, and a fan rotor rotatable relative to the fan casing about an axis. The fan rotor has a plurality of fan blades. A shroud is coupled to a radially outer end of the plurality of fan blades. The shroud includes an axially oriented protrusion extending from a distal end of the shroud towards the fan casing, wherein the shroud and the protrusion radially overlap a portion of the casing. A clearance is formed between the protrusion and the casing defining a convoluted flow path.

In addition to one or more of the features described herein, or as an alternative, in further embodiments the casing has a trench formed therein, wherein the trench is generally aligned with the protrusion.

In addition to one or more of the features described herein, or as an alternative, in further embodiments the protrusion is received within the trench such that the protrusion axially overlaps the casing.

In addition to one or more of the features described herein, or as an alternative, in further embodiments a contour of the trench is complementary in shape to the protrusion.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
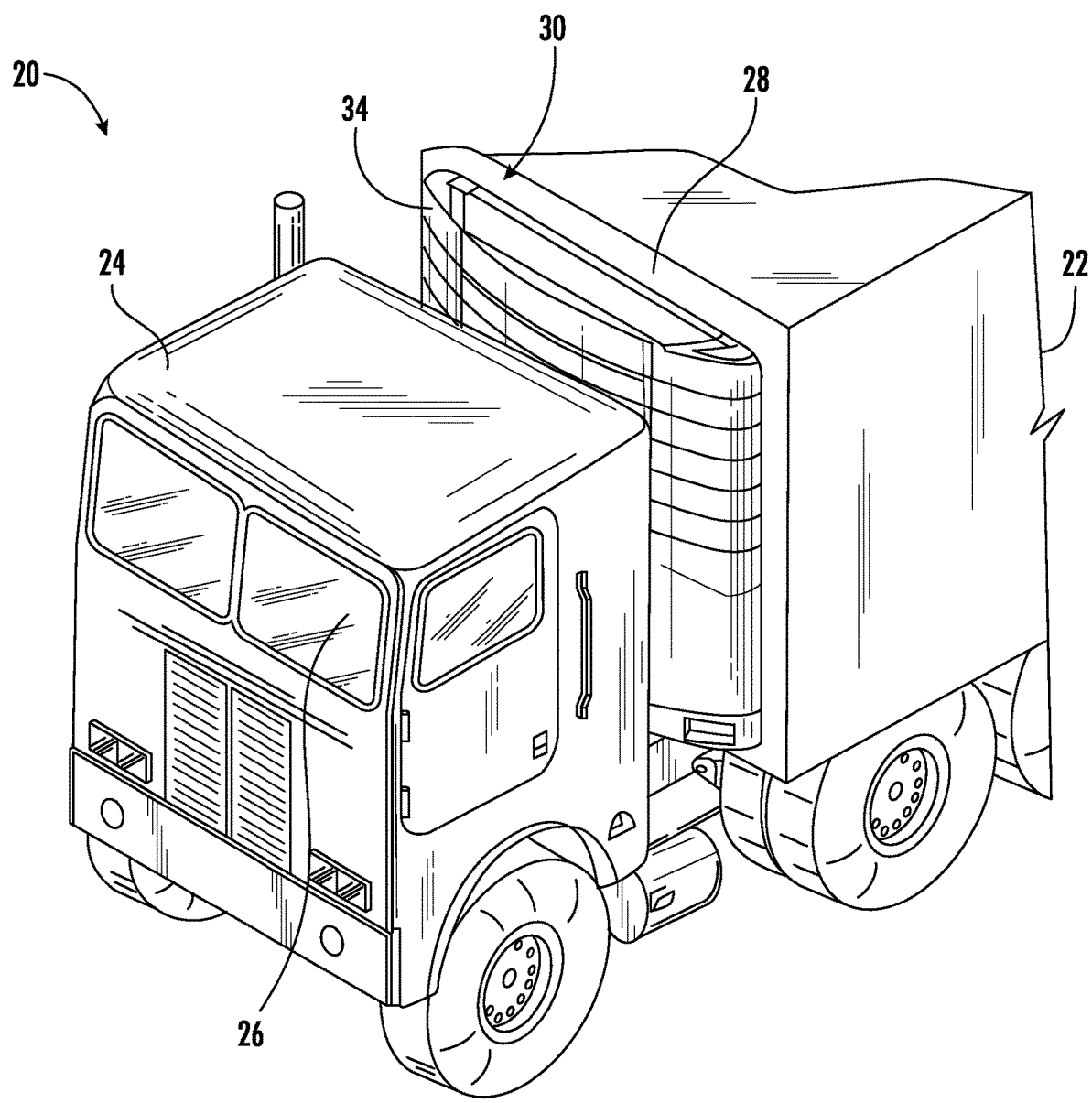
FIG. 1 is perspective view of a portion of a transport refrigeration system.
Figure 2:
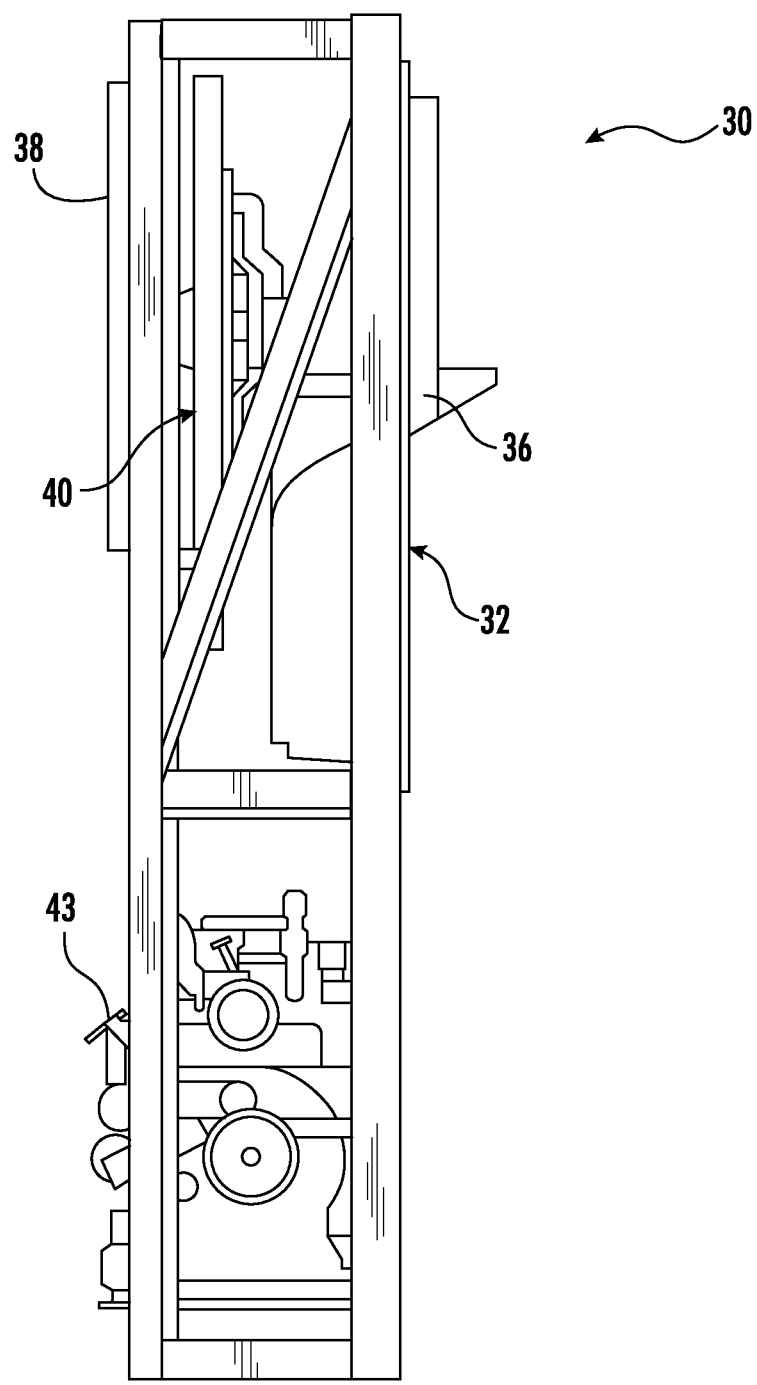
FIG. 2 is a side view of a portion of a transport refrigeration unit of a transport refrigeration system.

A detailed description of one or more embodiments of the disclosed apparatus and method are presented herein by way of exemplification and not limitation with reference to the Figures.

Referring now to FIGS. 1-4, an example of a transport refrigeration system 20 is illustrated. As shown, the transport refrigeration system 20 includes a trailer 22 towed or otherwise transported by a tractor 24 including an operator's compartment or cab 26 and also including an engine (not shown), which acts as the drivetrain system of the system 20. The system 20 additionally includes a transport refrigeration unit 30 configured to maintain cargo located within the trailer 22 at a selected temperature by cooling the cargo space of the trailer 22. The transport refrigeration unit 30 is mounted at the front wall 28 of the trailer 22. Although the transport refrigeration unit 30 is illustrated as being mounted to a trailer 22 pulled by a tractor 24, in other embodiments, the transport refrigeration unit 30 may be adapted to cool a confined space, such as a rail car for example.

The transport refrigeration unit 30 includes a structural framework, designated generally at 32, that forms a skeletal structure from which various components of the transport refrigeration unit 30 are supported. The transport refrigeration unit 30 includes an outer cover 34 (FIG. 1) supported on the structural framework 32. As is common, various panels or other portions of the outer cover 34 may be hinged and/or removable to provide efficient access to the interior of the transport refrigeration unit 30 to perform routine maintenance. The cover 34 is configured to cover not only the framework 32, but also all of the components of the refrigeration unit 30, including but not limited to a compressor (not shown), an evaporator and associated evaporator fan/motor assembly (not shown) disposed within the confines of the evaporator housing 36, a condensing heat exchanger 38, and the at least one condenser fan assembly 40.

The transport refrigeration unit 30 is typically powered by a diesel engine 43, separate from the engine of the tractor 24. The engine 43 drives an electric generator (not shown) that produces and supplies electrical power to portion of the transport refrigeration unit including a compressor motor (not shown) that drives the compressor (not shown), the evaporator fan motor not shown), and the motors associated with the one or more condenser fan assemblies 40, as well as any other electrically powered equipment associated with the transport refrigeration unit 30.

Figure 3:
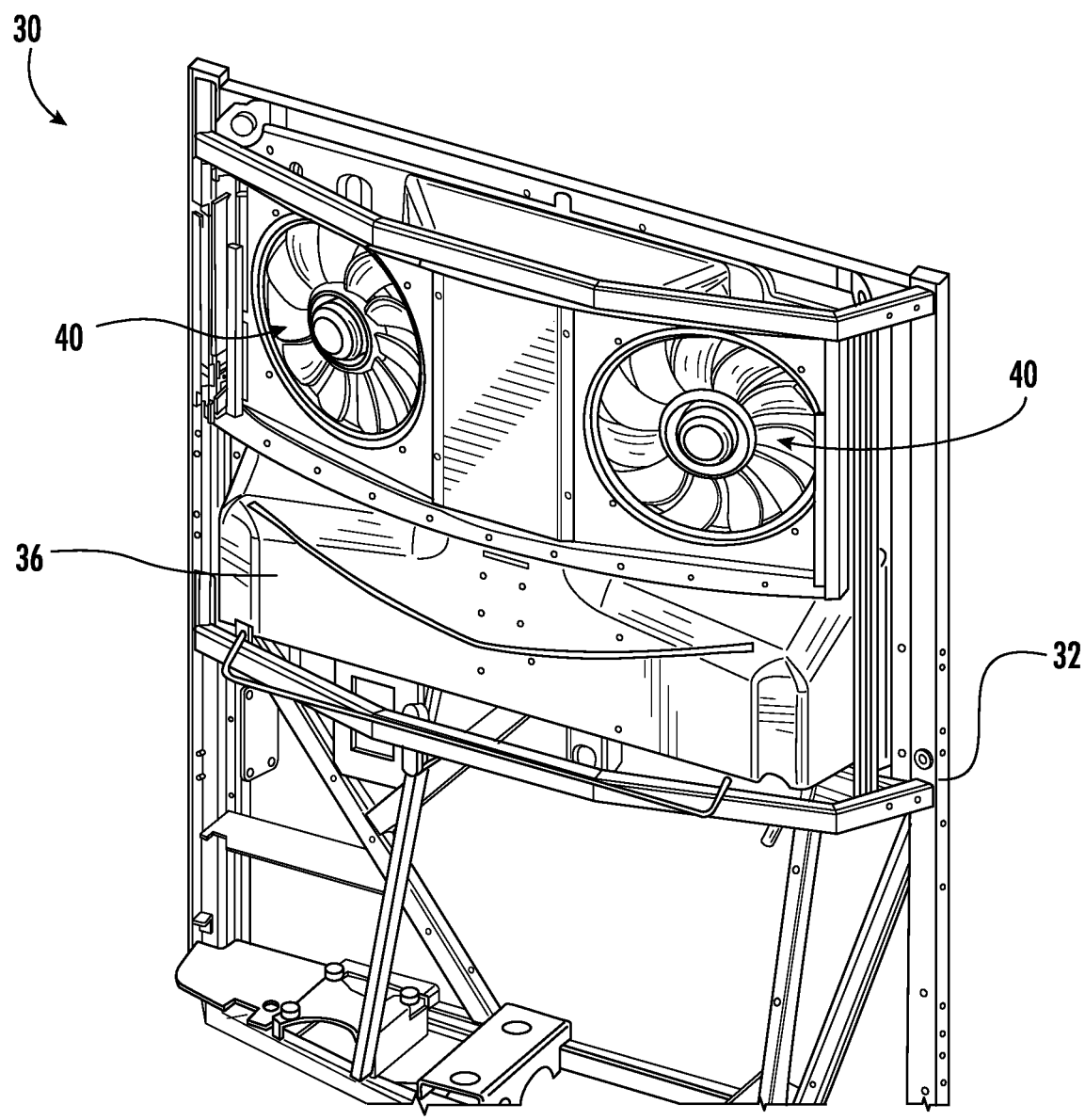
FIG. 3 is a perspective view of a portion of a transport refrigeration unit of a transport refrigeration system.
Figure 4:
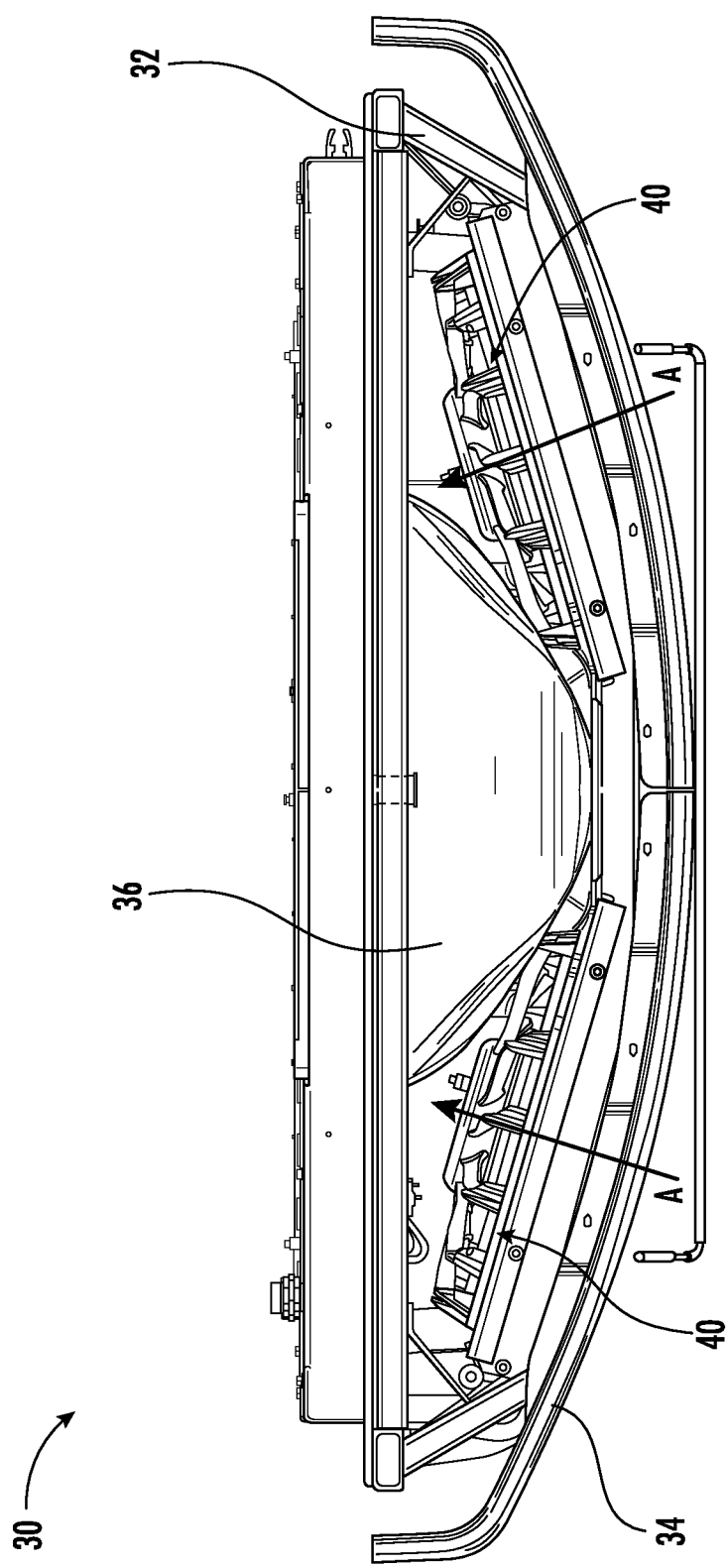
FIG. 4 is a top view of the portion of the transport refrigeration unit FIG. 3.
Figure 5:
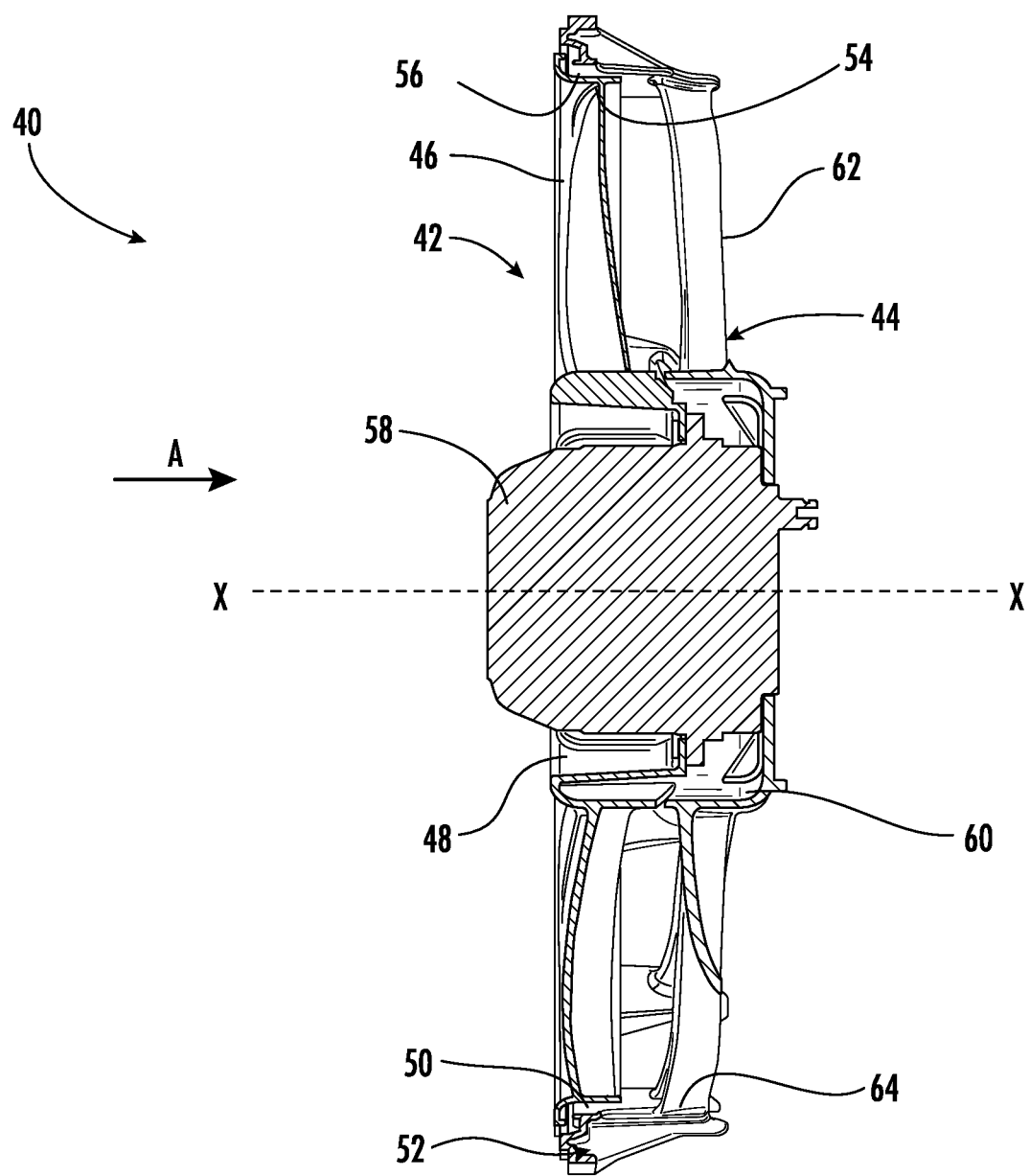
FIG. 5 is a side view of a condenser fan assembly of a transport refrigeration unit according to an embodiment.
Figure 6:
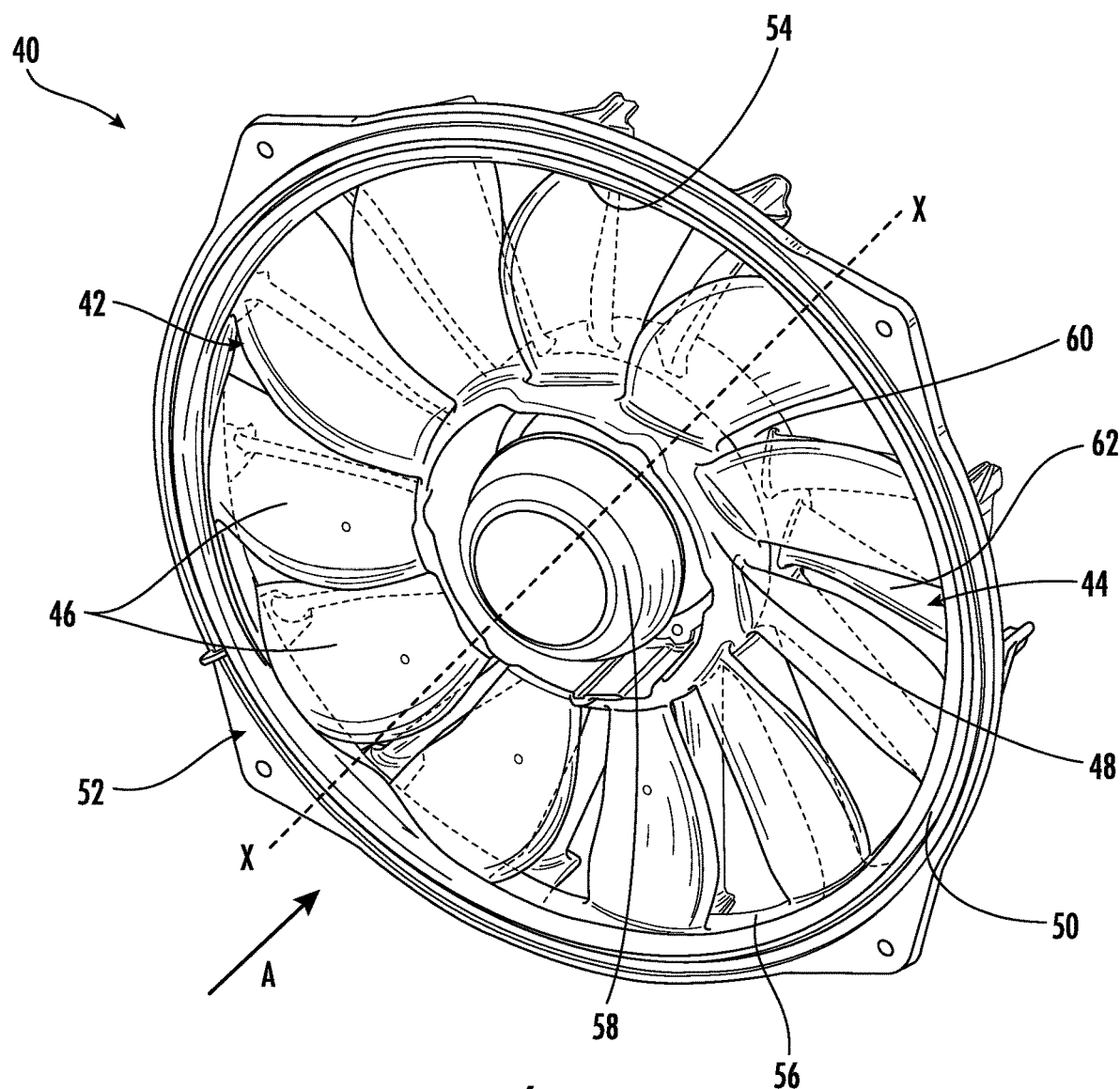
FIG. 6 is a perspective view of an inlet end of a condenser fan assembly of FIG. 5 according to an embodiment.
Figure 7:
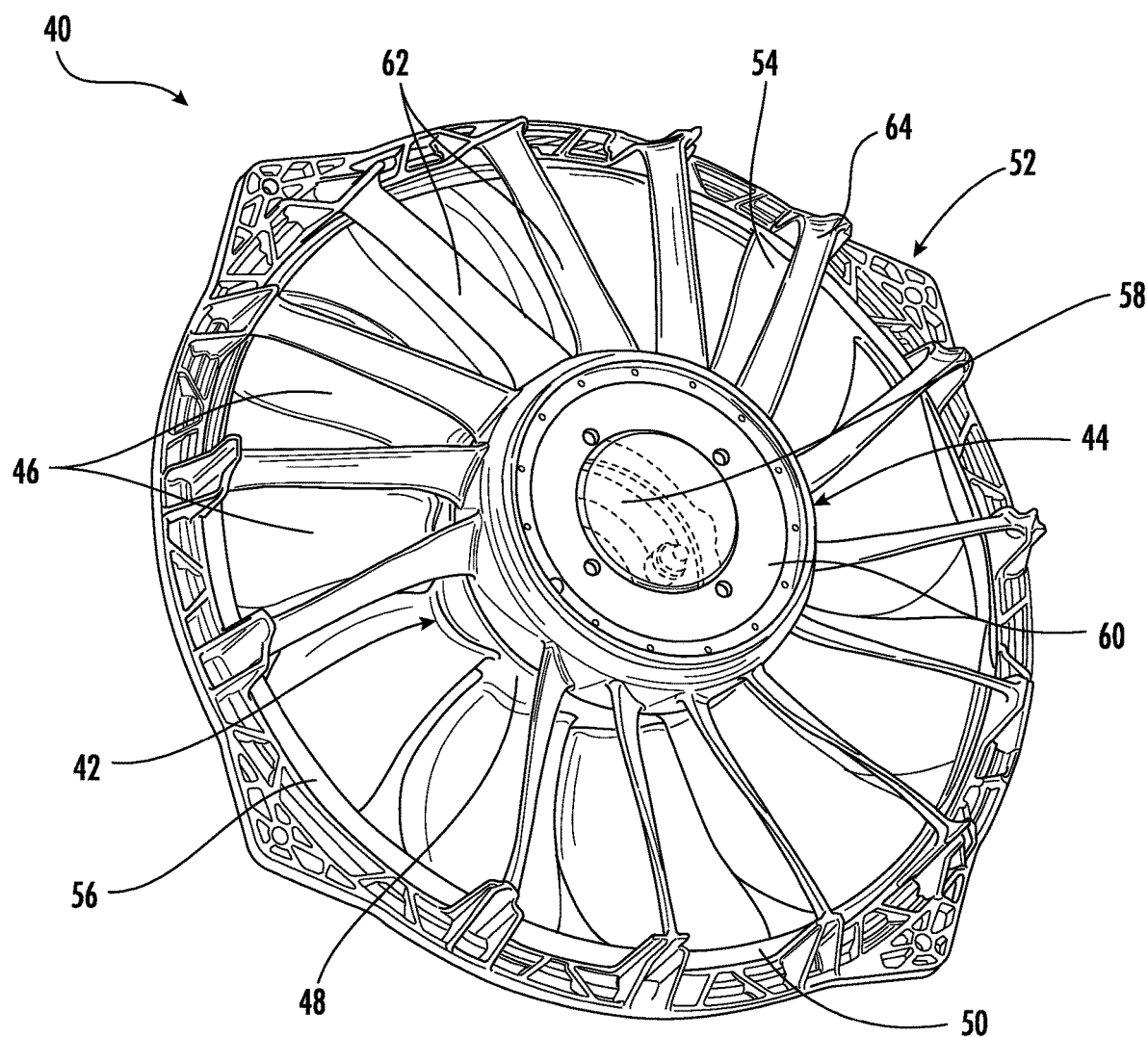
FIG. 7 is a perspective view of a discharge end of the condenser fan assembly of FIG. 5 according to an embodiment.

In the illustrated, non-limiting embodiment, best shown in FIGS. 3 and 4, the transport refrigeration unit 30 includes two condenser fan assemblies 40, positioned above the diesel powered engine 43 and the electric generator (not shown) driven by the engine 43, at the forward side of the structural framework 32, aft of the condenser 38 and forward of the evaporator housing 36. The condenser fan assemblies 40 may be arranged within the same plane, or alternatively, may be arranged at an angle relative to one another, as shown in the FIGS. By positioning the condenser fan assemblies 40 vertically and generally parallel to the plane of the evaporator housing 36, the air, illustrated schematically with arrow A, output from the condenser fan assemblies 40 flows naturally along a horizontal axis towards the evaporator housing 36. However, the evaporator housing 36 presents a barrier to further progression of the air flow, such that a major portion of the air flow discharged from the condenser fan assemblies 40 must turn ninety degrees and flow upward toward the top of the transport refrigeration unit 30 to be released to the atmosphere. In addition, about a quarter of the flow is designed to exit downwards through the engine compartment to help cool the engine container therein. The flow going downward has to make about a hundred and fifty degree turn to get around the evaporator housing 36. As a result, in conventional systems, the amount of flow provided to the engine compartment is limited.

With reference now to FIGS. 5-8, an example of a condenser fan assembly 40 usable in a transport refrigeration unit 30 is shown in more detail. In the illustrated, non-limiting embodiment, the condenser fan assembly 40 is an axial flow fan including a fan rotor 42 and a fan stator 44 arranged in a serial airflow relationship; however, it should be understood that other suitable types of fans, such as a mixed flow fan for example, are also within the scope of the disclosure.

The fan rotor or impeller 42 has a plurality of fan blades 46 extending radially outwardly from a rotor hub 48 into an opening 50 defined by an outer casing 52. Although the radially outer end 54 of each fan blade 46 is illustrated as being connected to or integrally formed with a fan shroud 56, embodiments where the impeller 42 does not include a shroud 56 are also contemplated herein. A motor 58 operably coupled to the fan rotor 42 may be used to rotate the fan rotor 42 and the fan blades 46 about the fan axis X to cause air A to be drawn in and pass through the opening 50. The motor 58 may be oriented such that an axis of rotation of the motor 58 is arranged parallel to or coaxial with the fan axis X.

The stator 44 includes a stationary central hub 60 and a plurality of stationary guide vanes 62 extending radially outward from the hub 60. The distal ends 64 of the one or more of the guide vanes 62 may, but need not be connected to the outer casing 52. The guide vanes 62 are located downstream from the fan blades 46 relative to the direction of airflow A through the opening 50, and define a discharge end 47 of the fan assembly 40. The plurality of guide vanes 62 may be formed with any configuration, for example a planar configuration, or configurations including lean or sweep in the circumferential or axial directions. In operation, the fan rotor 42 is rotated at relatively high speeds to induce the flow of air A through the casing 52, and in the process it creates a swirl in the direction of the fan rotation, such that the air A has both an axial component and a tangential component. The guide vanes 62 are disposed and shaped to straighten the flow exiting from the fan rotor 42.

Figure 8:
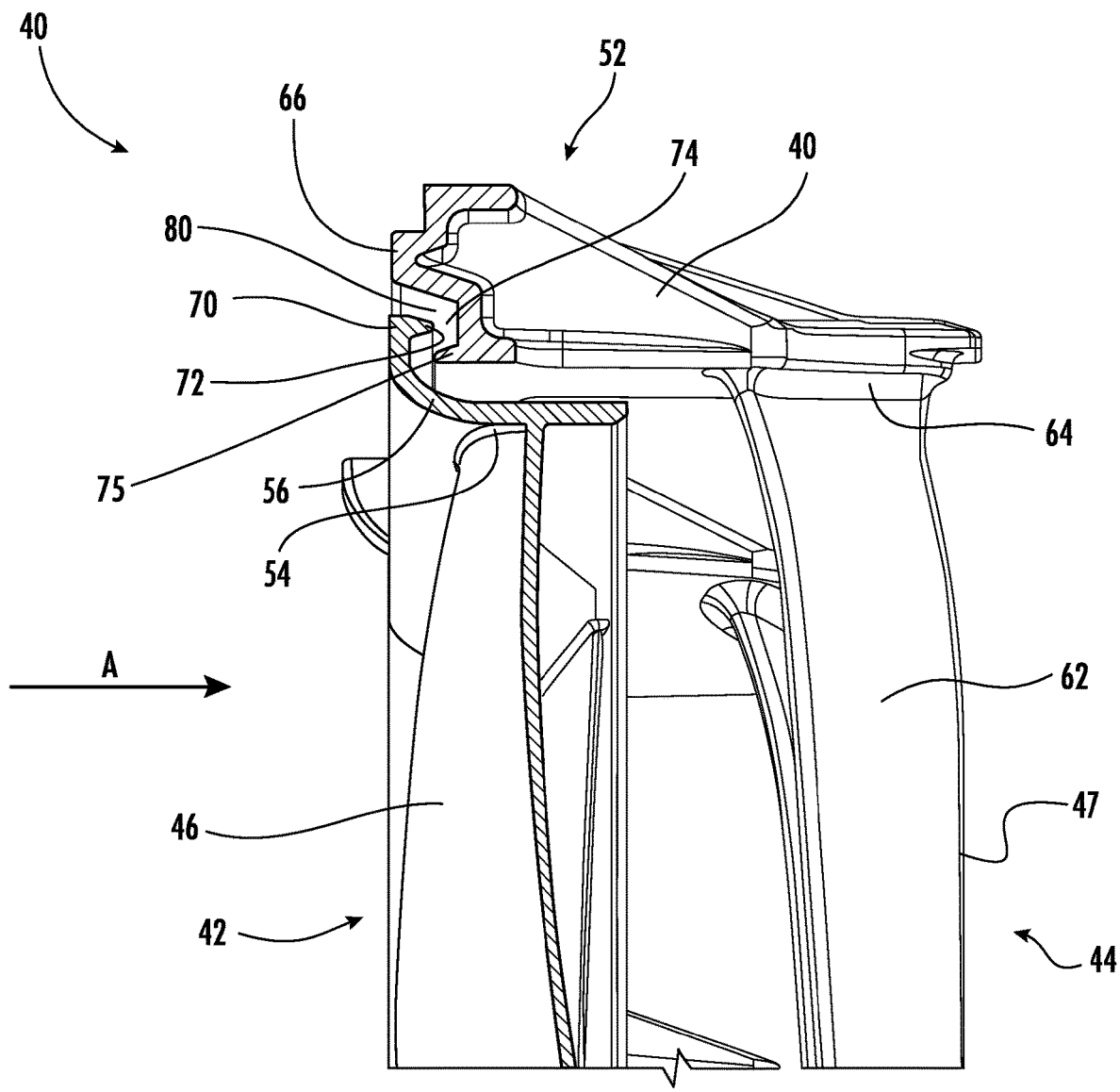
FIG. 8 is a detailed cross-sectional view of the interface between the fan rotor and the casing according to an embodiment.

With reference now to FIG. 8, a detailed cross-sectional view of the interface between the fan rotor 42 and the casing 52 at the upstream, inlet end 66 of the fan assembly 40 is illustrated in more detail. As shown, in an embodiment, the shroud 56 of the fan rotor 42 has a bellmouth curve or contour. A distal end 70 of the shroud 56 radially overlaps with the casing 52. Further, a protrusion 72 extends from the distal end 70 of the shroud 56 towards the casing 52. In the illustrated, non-limiting embodiment, the protrusion 72 extends axially, such as generally parallel to the axis of rotation X of the fan rotor 42 for example.

The casing 52 adjacent the distal end 70 of the shroud 56, has a non-planar configuration. In the illustrated, non-limiting embodiment, the casing 52 has a recess or trench 74 formed therein, the trench 74 being generally aligned with the protrusion 72. The protrusion 72 is received within the trench 74 such that in an embodiment, at least a portion of protrusion 72 and the casing 52 axially overlap. As shown, the trench 74 may have a complex contour or shape. In the illustrated, non-limiting embodiment, the trench 74 is generally complementary in shape to the protrusion 72. For example, the protrusion 72 includes first and second beveled edges, and the surfaces of the trench 74 opposite the beveled edges of the protrusion 72 are formed with a similar bevel. However, it should be understood that the contours illustrated and described herein are intended as an example only and that any suitable configuration is within the scope of the disclosure.

Figure 9:
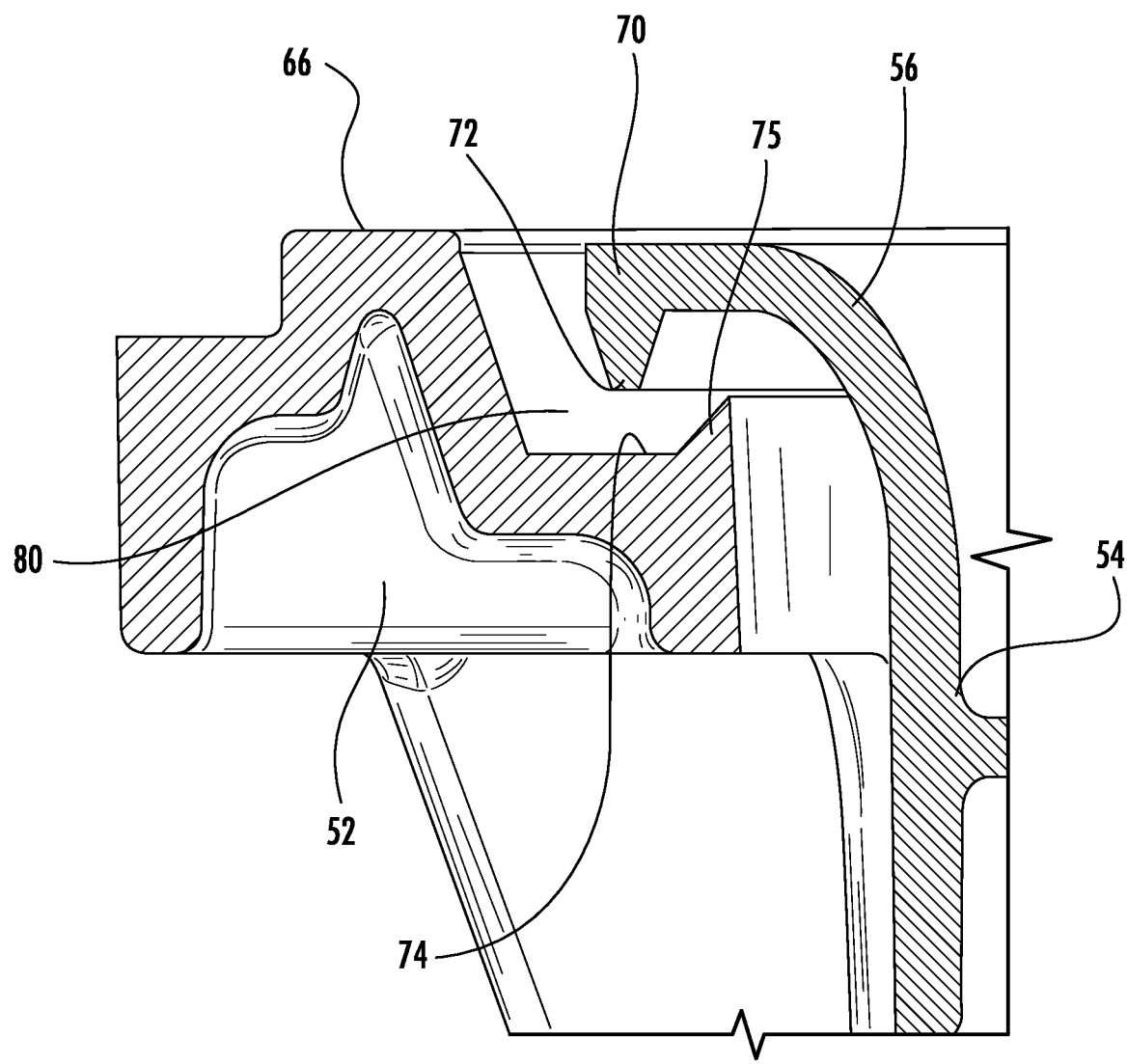
FIG. 9 is a detailed cross-sectional view of the interface between the fan rotor and the casing according to another embodiment.
Figure 10:
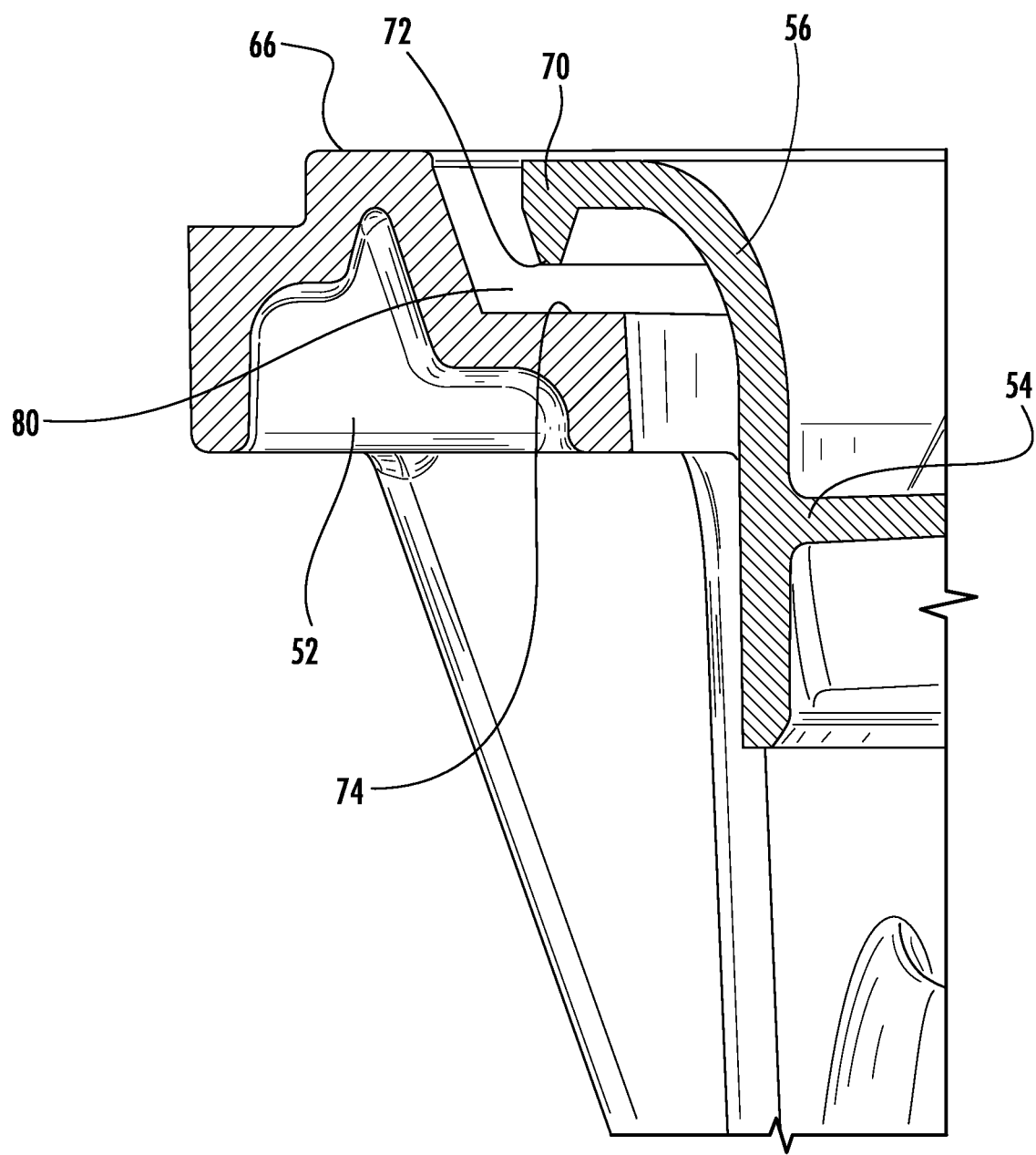
FIG. 10 is a detailed cross-sectional view of the interface between the fan rotor and the casing according to yet another embodiment.

In an embodiment, best shown in FIGS. 8 and 9, the casing 52 includes a lip 75 positioned adjacent an inner edge of the casing 52 and extending axially towards the distal end 70 of the shroud 56. The lip 75 may partially define the contour of the trench 74. Accordingly, in embodiments where the contour of the trench 74 is complementary to the beveled edges of the protrusion 72, the lip 75 may be formed with an angled surface. In an embodiment, the angle of the surface of the lip 75 adjacent the protrusion 72 may be between 0 degrees and 90 degrees. Further, in other embodiments, such as shown in FIG. 10, the casing 52 may not include a lip 75.

The protrusion 72 is axially offset from the casing 52 such that a clearance 80 is formed between the shroud 56 and the casing 52. The clearance 80 defines a fluid flow path including multiple turns resulting in a change in the direction of fluid flow there through. In the illustrated, non-limiting embodiment, the flow path of the clearance 80 includes more than one turn requiring a 180° change in the direction of fluid flow. The clearance 80 defined between the protrusion 72 and the trench 74 and fluidly connecting the interior of the fan assembly 40 to the inlet end 66 forms a convoluted and tortuous flow path for the tip clearance leakage flow. As a result, the flow path defined by the clearance 80 is highly restrictive and effectively forms a labyrinth seal where the backflow is forced to turn abruptly multiple times.

During operation of the fan assembly 40, a portion of the high pressure air downstream of the fan assembly 40 tries to migrate upstream to the lower pressure area by any available path. The high pressure air trying to migrate upstream through the gap between the shroud 56 of the fan rotor 42 and the casing 52, commonly referred to as the tip clearance leakage flow, is guided by the rotor shroud 56 toward the clearance 80 between the protrusion 72 and the trench 74. The contour of the shroud 56 in combination with the axially oriented protrusion 72 extending from the distal end 70 of the shroud 56 and the corresponding trench 74 causes any tip clearance leakage flow moving toward the clearance 80 to make at least a first 180 degree turn about the end of the casing 52, and a second 180 degree turn about the protrusion 72. The first and second 180 degree turns are oriented substantially parallel to the rotational axis X of the fan rotor 42. Each turn in the fluid flow produces a pressure drop which enables the fan assembly 40 to withstand a higher differential pressure and experience a reduced leakage loss. Further, during operation, the fan rotor 42 may deflect thereby reducing the width of the clearance 80 formed between the protrusion 72 and the trench 74.

Accordingly, use of an axially oriented protrusion 72 extending from the fan rotor 42 in combination with a trench 74 formed in the casing 52 minimizes leakage losses, thereby improving fan performance while maintaining a necessary compactness of the fan assembly 40.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A transport refrigeration unit for use with a transport trailer comprising:
   a structural framework mountable to a wall of the transport trailer;
   a condenser heat exchanger unit mounted to the structural framework;
   an evaporator housing separated from the condenser heat exchanger by a distance; and at least one condenser fan assembly positioned aft of the condenser heat exchanger unit and forward of the evaporator housing, the at least one condenser fan assembly including:
- a fan casing having a plurality of guide vanes connected thereto, the fan casing having a trench formed therein, a first and second end surface of the trench being beveled;
- a fan rotor arranged upstream from the plurality of guide vanes relative to a flow through the condenser fan assembly, the fan rotor being rotatable relative to the fan casing about an axis, the fan rotor having:
  - a plurality of fan blades; and
  - a shroud coupled to a radially outer end of the plurality of fan blades, the shroud including an axially oriented protrusion extending from a distal end of the shroud towards the fan casing, wherein the protrusion is aligned with a central portion of the trench and includes a first beveled edge and a second beveled edge, the first beveled edge being positioned adjacent to the first beveled surface and the second beveled edge being located adjacent to the second beveled surface; and
- a clearance formed between the protrusion and the casing defining a convoluted flow path that wraps around both the first beveled edge and the second beveled edge of the protrusion.

2. The transport refrigeration unit according to claim 1, wherein the convoluted flow path forms a labyrinth seal including a plurality of abrupt turns.

3. The transport refrigeration unit according to claim 2, wherein the plurality of abrupt turns includes at least one 180 degree turn.

4. The transport refrigeration unit according to claim 3, wherein the at least one 180 degree turn of the convoluted flow path directs an air flow parallel to the axis.

5. The transport refrigeration unit according to claim 3, wherein the at least one 180 degree turn includes a first 180 degree turn and a second 180 degree turn.

6. The transport refrigeration unit according to claim 1, wherein the shroud radially overlaps a portion of the casing.

7. The transport refrigeration unit according to claim 6, wherein the shroud has a bellmouth curve.

8. The transport refrigeration unit according to claim 6, wherein the protrusion extends from a portion of the shroud in overlapping arrangement with the casing.

9. The transport refrigeration unit according to claim 1, wherein a contour of the trench is complementary in shape to the protrusion.

10. The transport refrigeration unit according to claim 1, wherein the casing includes a lip, and the trench is at least partially defined by the lip.

11. The transport refrigeration unit according to claim 10, wherein a surface of the lip has an angle between about 0 degrees and 90 degrees relative to horizontal.

12. The transport refrigeration unit according to claim 1, wherein the convoluted flow path fluidly couples an interior of the fan assembly to an inlet end of the fan assembly.

13. The transport refrigeration unit according to claim 12, wherein the convoluted flow path restricts a flow of air from a high pressure area towards a low pressure area.

* * * * *